Patented May 30, 1950

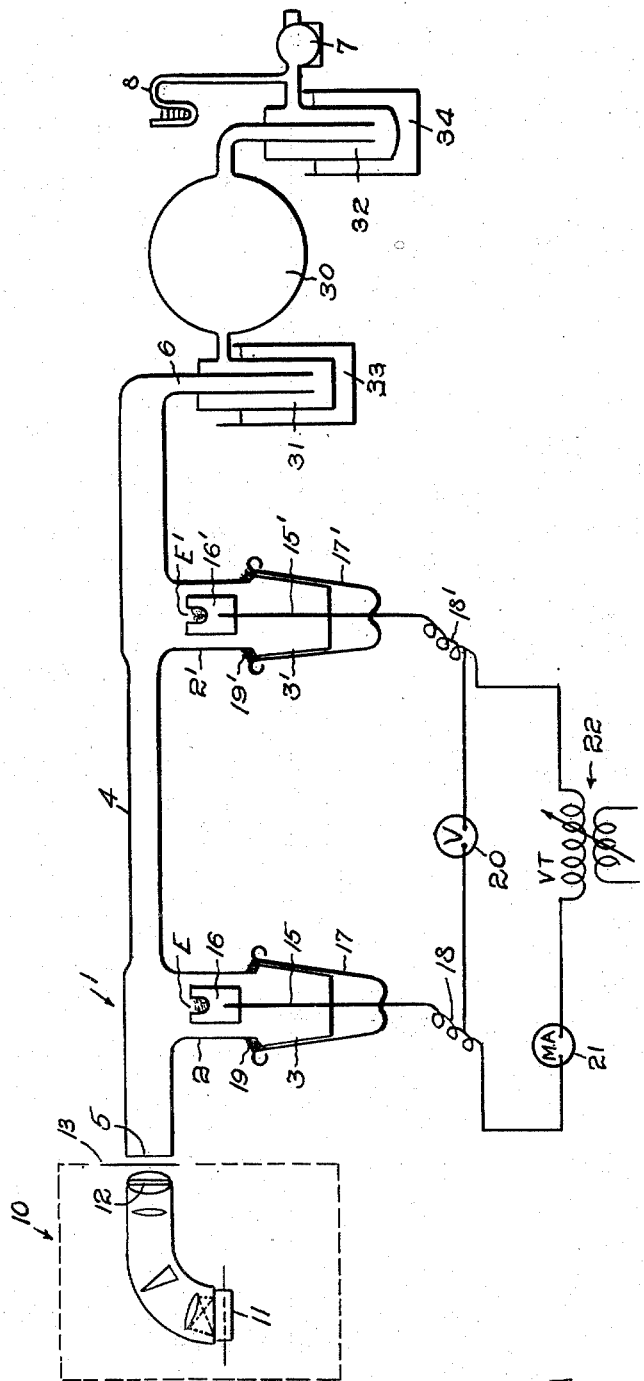

2,509,649

UNITED STATES PATENT OFFICE 2,509,649

SPECTROGRAPHIC TREATMENT OF ORGANIC MATERIALS

Daniel P. Norman, Ipswich, Mass., assignor to New England Spectrochemical Laboratories, Ipswich, Mass., a partnership Application June 17, 1947, Serial No. 755,044

10 Claims. (Cl. 88—14)

The present invention relates generally to methods or processes for the spectrographic treatment of solid or liquid organic compounds and aggregates, for analytic or other purposes. More particularly it provides novel steps and procedure wherein the spectra of subject materials are directly excited in a vacuum discharge tube without prior independent volatilization of the material and wherein one and the same electrical means may be utilized to introduce the compound or material into the discharge and to cause it therein to radiate light. While the invention may be employed for the analytic treatment of a variety of substances under a variety of conditions, it is especially adapted for use with organic materials of high molecular weight. In general, with somewhat variant degree of accuracy as to certain substances, the invention is applicable to the determination of variations in the chemical or physical states within molecules or aggregates of molecules which are reflected in the emission and absorption spectra of the molecular fragments caused to radiate light by the action of an electrical discharge in an evacuated tube.

In industrial operations a large variety of circumstances arise which cause variations in the energy relationships within molecules or macromolecules without causing sufficient energy change to be detected by conventional chemical or physical methods. Thus it is not readily possible by conventional methods to determine the changes taking place within cotton fibres during variations in the process or duration of mercerization, or in urea-formaldehyde polymers upon small changes in curing time or aging. In the further and more detailed description of the present invention, it will be described as being applied to the analysis of such complex materials as natural and synthetic polymers of high molecular weight, the application of this invention to simpler organic molecules and aggregates being self-evident.

In the present state of the art, prior to my invention, the spectrographic molecular analysis of organic materials is restricted to those which give well-defined absorption spectra observable in the ultra-violet, visual, or infra-red wave-length regions and hence to materials which are sufficiently transparent, or can be made so by volatilization, solution, or similar process, to transmit enough light to permit of the measurement of such absorption bands. Where the materials are naturally opaque and cannot be diluted or vaporized without disturbing the fundamental nature of the material, such spectrographic methods cannot be applied. This is true in general of most organic materials of a polymeric nature other than a few transparent ones, and even in the latter, the spectroscopic measurements of absorption frequently fail to produce useful results.

I have discovered that if the materials to be analyzed are introduced into or onto the electrodes of a vacuum discharge tube, and sufficient electrical energy is provided to dissociate and vaporize the materials, the resultant radiation emitted by the said dissociated or vaporized material, under controlled conditions, is directly affected by the past history of the particular material as well as by its gross chemical composition, so that two samples of the same material which have been subjected to different conditions which are insufficient to change their gross chemical composition, will still yield sufficient observable differences in their spectra in a discharge to permit their being readily distinguishable one from the other.

The novel methods of my invention as herein disclosed and claimed will be more fully described in connection with the accompanying drawing illustrating typical apparatus adapted for the practice of the methods concerned. It will be understood that the method invention is independent of any specific structural form or design of apparatus, numerous modifications of which will be apparent to those skilled in the art whereby the steps and procedures of the herein disclosed method may be practiced.

The single figure of the drawing is a schematic representation of one typical apparatus as above mentioned.

Referring to the drawing in more detail, a discharge tube is designated generally at 1, including in this illustrative embodiment a plurality of arms 2, 2' shown with taper necks 3, 3'. The tube includes between the arms a capillary portion 4 and has at one end a quartz or other similarly light transmissive window 5, the other end 6 being adapted for sealed connection with an evacuating means or vacuum pump designated at 7, herein through intermediate devices to be referred to.

Axially opposite the quartz window 5 is a spectrograph indicated generally at 10, having its optical axis aligned with the discharge tube 1. It will be understood that in the schematic drawing the spectrograph 10 and the discharge tube 1 are shown greatly out of relative proportion, the dotted line about the spectrograph indicating the smaller scale of the latter as compared with the electrical discharge equipment. The spectrograph 10 includes a recorder 11 which may be photographic, electronic or other type which is adapted to produce a record of the spectra or changes in the spectra as the sample is consumed by the discharge. The slit of the spectrograph is indicated at 12, and a shutter or closure therefor at 13.

Associated with each side arm 2, 2' of the tube is a metal electrode 15, 15' having the inner ends constructed and arranged as a holder 16, 16' for the sample E, E' of the material to be analyzed. The material of which the electrodes are made is not critical. Due to the high current-densities required to dissociate some materials, aluminum and other low-melting metals are not suitable. Free machining stainless steel is a suitable material so long as neither sulfur nor selenium are to be considered in the analysis of the materials placed in the electrodes, because either or both of these elements may be found present in such steels. Where sulfur or selenium are of interest in the material being analyzed the electrode metal must be free of them. Iron, nickel and brass electrodes have been found of use for this purpose.

The discharge tubes such as 1 are preferably made of quartz or other thermally resistant material. A transparent material is preferred, as it is more readily possible to determine the cleanliness of the tube by inspection, since such tubes can be freed of organic contaminants and reused again and again, by burning them out in a stream of oxygen. For this reason it is preferable not to have the electrodes permanently attached to the discharge tube but to have them attached to auxiliary pieces which can make a vacuum-tight seal with the discharge tube, but can readily be disassembled for cleaning and refilling. Such an auxiliary system is illustrated in the figure, where the side arms 2, 2' of the discharge tube 1 are equipped with standard taper necks 3, 3' adapted to receive and make joint with mating fittings 17, 17' of heat-resistant glass such as Pyrex carrying stout tungsten leads 18, 18' sealed in by glass-to-tungsten seals. These leads serve to carry the electric current to the metal electrodes 15, 15' which in turn support the sample E, E'. Direct contact between ground glass or quartz surfaces usually is not in itself sufficient to enable a good vacuum to be maintained within the discharge tube. Because of the danger of contamination of the discharge by organic lubricants it is not practicable to seal the joints in the conventional manner by putting grease between the two ground seals, but a good vacuum seal may be readily obtained by putting a low-vapor-pressure wax 19, 19' around the outside edge of the seal. The particular structure for such a readily disassembled electrode assembly is not important as regards the practice of my method invention here concerned. Numerous other means for the purpose will readily occur to one skilled in the art of physical chemistry, that illustrated being one convenient, flexible, and easily fabricated form.

As shown in the drawing, a sample E, E' of the material to be analyzed, for example a cotton cloth, is introduced into a cavity machined, cast or otherwise fabricated in the holder portion 16, 16' of the metal electrodes 15, 15' or the material may be placed on or as a cap over the tops of the electrodes. While in the particular apparatus illustrated twin electrodes 15, 15' are provided and the discharge is initiated and maintained by an alternating current applied to the electrodes, it is equally possible to use a direct current discharge and to introduce the sample only into a single electrode, preferably the cathode. The relative ease and low expense of obtaining and controlling a suitable alternating current, the symmetry of the electrical fields and the distribution of radiation within the field, as well as the larger sample which can be consumed in a twin-electrode assembly, make the apparatus illustrated the preferred form for most analyses. However, in certain cases, as when only a minute sample is available, or it is desired to make precise measurements of the influence of the electrical properties of the sample upon the properties of the discharge, as in determining changes in the electric charges on large molecules, the direct current discharge with the sample in a single electrode may be preferred.

The exact dimensions of the electrodes and of the tubes within which the discharge takes place are not in themselves critical so long as they are matched to the materials being analyzed and the spectrograph used in obtaining the spectrograms of the light radiated by the excited sample or its decomposition products. It is well known to spectrographers that a reduction in the diameter of the capillary of the discharge tube and/or an increase in its length yields increased brightness of the discharge, and by thus varying the dimensions of the capillary portion 4 of the tube 1 and the distance between the electrodes 15, 15' it is possible to vary the intensity of the emitted radiation over a very wide range so that its spectrum can be photographed with either fast or slow spectrographs of suitable dispersion and resolving power. A spectrograph of high resolving power and dispersion is definitely to be preferred over a smaller instrument, because of the complexity of the spectra yielded by such a discharge as here concerned. An inter-electrode distance at 15, 15' of 10 to 20 centimeters and a capillary diameter at 4 of from 5 to 10 millimeters yields sufficient intensity of radiation in most cases to permit the photography of spectra of suitable density with an exposure time as short as five seconds with a large grating spectrograph and no auxiliary lens, while tubes of such dimensions are not overly fragile and are readily aligned with the optical axis of the spectrograph.

It is important that the electrodes and tubes be thoroughly clean before the material being analyzed is introduced, because slight traces of grease or other organic impurities will contaminate the discharge and superpose their characteristic spectra on those of the material being analyzed. To this end it is preferable that the metallic electrodes be machined without the use of lubricants and then be thoroughly degreased and otherwise cleaned. As a final precaution it is well to submit the electrodes to the action of a discharge before introducing the material to be analyzed, and recording their spectra as a proof that they have been properly cleaned.

In the practice of my invention the pressure or vacuum at which the discharge tube is operated is highly important and may be regarded as critical. The nature, appearance and spectrum of a gaseous discharge varies with the pressure at which such a discharge is operated. At very high or very low pressures the discharge will not pass at all. Generally herein the term discharge will be understood as connoting that type of gaseous discharge known as a glow discharge; further, the spectrum effects concerned will be understood as caused to take place in that particular portion of the glow discharge known as the positive column. Satisfactory results can and have been obtained in what is known as the hollow-cathode type of discharge, and such procedure is intended to be included within the scope of the present invention, but in general the use of the glow discharge is preferred.

Glow discharges are commonly observed at pressures of between 0.1 and 10 millimeters of mercury. Now at the upper pressure values, the spectrum of the gas remaining in the tube, whether it be residual air or a deliberately introduced gas used to carry a high current in the glow discharge, will have so marked an influence on the observed spectra as to minimize the effects of the material being analyzed. Therefore it is an important feature of my invention that the residual gas within the discharge tube be as small as possible, and generally less than three millimeters of mercury. If, however, the pressure within the tube is too low, say less than 0.01 millimeters of mercury, difficulty will be encountered in initiating the discharge. In such case the vapor pressure of the organic material being analyzed, or of the gases occluded on it, is usually sufficient to permit a high-voltage discharge to start. Failing this, a suitable pure gas such as argon or a similar noble gas, may be introduced at a pressure of about 0.1 millimeter of mercury or thereabouts, depending upon the electrical potential being used, to carry the discharge. Such a gas may further be used as spectrographic internal standard if desired.

It has been found that once the discharge has been initiated the majority of organic materials will decompose with the evolution of large volumes of gas. In some cases enough gas may be evolved to extinguish the discharge, and in any case the pressure within the discharge tube I will be markedly increased in a non-reproducible fashion. To minimize such a pressure change, a large reservoir 30 is connected to the discharge tube I of such capacity that when the vacuum pump 7 is continuously evacuating the apparatus the maximum pressure built up in the system does not exceed approximately 5 millimeters of mercury and preferably does not substantially exceed 2 millimeters. For the average size of discharge tube such a reservoir should be of at least three liters capacity; it may be of any desired shape. The discharge tube I must be protected from vapors arising in the vacuum pump 7 and the associated vacuum gauge or meter 8, and these in turn must be protected from the products of decomposition of the materials being used. This is most conveniently done by refrigerated traps such as 31, 32, containing any suitable refrigerant at 33, 34. In practice it is found that a single trap is not always sufficient.

The nature of the electrical potential used to excite the discharge may be varied over a wide range. In general, for a given distance between the electrodes, such as 15, 15', a given residual gas pressure within the tube, and the nature of the material being treated, there is a minimum voltage which must be exceeded before a current will flow and a discharge be initiated. For the purposes of my invention, however, it is not enough that a discharge merely be initiated. The discharge must be powerful enough to disrupt a solid or liquid sample and vaporize it, so that the material will enter the positive column of the discharge and be caused to radiate light. If however the discharge is too powerful it will disrupt all molecules back to their component atoms, and the resultant spectra will merely given a measure of the elements present in the sample. Consequently an important characteristic of the novel method of my invention is that a sufficiently powerful electrical excitation be used to break down the material being analyzed into molecular fragments and yet that it be not so powerful as to break all the molecular fragments into their component atoms. Further, within the broad principle of the invention significant results frequently may be had from certain monatomic fragments of the molecules, in particular such fragments of hydrogen and of carbon, because in many cases the principal energy changes within a molecule take place between a single relatively loosely bound atom and the rest of the molecule, but in general it is necessary that most of the material disrupted by the discharge emit its radiation in molecular fragments consisting of two or more atoms. Because optimum electrical conditions have to be varied with the nature of the material being analyzed the said optimum conditions may also be used as a measure of differences in the nature of the materials. Accordingly, for use in such electrical measurement, the apparatus desirably includes appropriate meters, such for example as a voltmeter 20 connected across the leads 18, 18' and an ammeter or milliammeter 21 connected between one of the leads and the power source represented by the variable transformer 22.

It is manifest that the electrical conditions needed to fulfill the foregoing requirements as to disruption and vaporization of the subject material will vary among different materials. In general, potentials of over 500 volts are needed and currents of the order of at least 0.1 ampere. In many cases a current of over 1 ampere is required to disrupt a solid sample. Ordinarily the current is more critical than the potential, provided the potential is greater than that needed to initiate the discharge at the selected electrode distance and residual gas pressure. Potentials from 500 to 25,000 volts are readily obtainable and are satisfactory, but the currents in most instances should exceed 100 milliamperes, because otherwise not enough material will enter the discharge to yield satisfactory results.

A typical sequence of operations in carrying out an analytical treatment of a subject material is this: The discharge tube I and the one or more electrodes 15, 15' are thoroughly cleaned. The sample is placed on the electrodes as at E, E', the electrode assembly is sealed to the tube I and the enclosed system is evacuated as by means of the pump 7 to the selected residual gas pressure. The tube system is aligned with the optical axis of the spectograph 10 and the appropriate electrical source is connected to the leads 18, 18' extending to the electrodes. The spectrograph shutter 13 being opened, the current is passed through the tube I thus initiating the discharge. Thereupon the spectra of the discharge are recorded as at 11 as a function of time, that is by a record moving along a time axis, so as to give a visible record of changes in the spectra with time, until the test sample is completely decomposed.

The spectrographic observations may be made anywhere in the spectrum range which can be recorded by available instruments, but in general, the spectra of most interest can be observed in the wave-length range from 2000 A. to 6800 A. The spectra of the following types of molecular fragments and atoms are among those most frequently encountered and are noted as representative of those regularly observed: H, C, C+, $CO_2$, CO, $N_2$, CN, OH, HCHO and numerous others, including the continua associated with the higher polyatomic radicals or molecules. In many cases, radicals such as HCHO may be observed in absorption against the bright continuous emission background due to some other molecular fragments.

The method of my invention novelly recognizes and utilizes the fact that under the stated conditions the appearance and disappearance of the spectra of the constituents enumerated above and those of other similar constituents and the relative intensities of the spectra of the various constituents vary not only with the major chemical changes in the samples, but also that within a group of samples of the same general composition they vary with the history of the individual sample.

By way of further explanation and illustration of the invention concerned a number of examples are here given of application of the method in actual practice thereof. Assume for instance that a series of cotton samples from the same bolt of raw cotton are subjected to conventional mercerizing treatment, but each sample receives the treatment for a different length of time. The samples then being subjected to treatment according to my method, the observed spectra will be found to vary in a regular manner with the variation in degree of mercerization, reflecting the changes in energy within the cotton fibres with changes in the degree of mercerization. Further, if another sample from the same bolt is subjected to mercerization under the same conditions but for an unspecified length of time, it is possible to determine the duration of the mercerization period by comparing its spectrum obtained by my process with the spectra of the series of standards previously run; conversely, if the mercerizing solution has changed in quality in the course of the processing, the effective degree of mercerization can be determined by the changes in the spectrum and the material treated accordingly in the plant.

Another example of application of the method is that to such materials as urea-formaldehyde plastics and resins, which are usually cured for a finite time at a given temperature. If a series of such plastics are prepared, differing in curing time or curing temperature the one from the other, and their spectra observed in the discharge tube by my process, it will be found that the spectra vary regularly with the variations in curing conditions. Thereafter, it is possible to pull test pieces of the same plastic or resin out of the production line and prove, by their spectra in the discharge, that they have or have not been cured for the specified time or at the specified temperature.

Yet another example of the application of my invention occurs in the field of synthetic fibres. It is well known that such fibres as rayon change with age, and it is very necessary to be able to predict what these changes will be, and whether any given batch of fibres will age normally or not. It is customary to apply accelerated aging tests to such fibres, but it is not always known that such accelerated aging tests actually produce the same type of change in the fibres that occurs in natural aging, and it is known that in certain cases the two types of aging do not produce the same changes in the fibres. Upon creating and comparing the discharge tube spectra of the accelerated aged and the normally aged fibres by my process, if the two spectra are the same then the two types of aging have produced the same effects; but if the observed spectra are dissimilar then the different manners of aging have produced different effects upon the fibres.

A still further example illustrates the diversity of characteristics and properties of test materials with regard to which my process is applicable. In this instance, drawn from actual practice, I had to deal with a series of closely related, complex organic compounds so produced that they are thought to have small but increasingly greater electrical charges among the several specimens. In accordance with the method each member was introduced into a highly reproducible electrical discharge, with sensitive and accurate electrical meters connected to the electrodes and to the discharge zone, as indicated in the drawing by way of example. The changes of potential within the discharge, and required to initiate the discharge, were measured and found to vary regularly with the variation in charge and distribution of charge on the organic molecules. Thereafter, the relative charge on each new member of the series synthesized could be measured rapidly and accurately by determining their influence upon the initiation and operating characteristics of the glow discharge with regard to potential whereas previously very tedious, difficult and expensive electrical transport methods were required.

While the present invention has herein been described in its application particularly to the determinations of changes in energy within molecular aggregates, it will be understood that the principles involved are applicable as well to the determination of other chemical changes in non-gaseous materials that can be electrically dissociated and caused, or their dissociation products caused, to radiate light in a glow discharge. The characteristic spectral radiations of any such materials or their dissociation products are spectroscopically treated in substantially the same manner as has been described hereinbefore, it being only necessary to adjust the electrical circuit to yield the optimum combination of dissociation of the materials and the excitation of the resultant products to produce radiation yet without at once completely reducing them to their component atoms.

It will be evident that in keeping with the invention there is substantial latitude for variation as to some aspects of the procedure. For instance, in the specific examples stated relatively small changes within a single type of material are generally entailed. It will be understood however that the invention is applicable also to instances involving substantial or gross changes in chemical structure, in connection with which the obtained discharge spectra vary markedly. Thus, for example, materials containing the hydroxyl radical, —OH, yield the band spectrum of the OH radical very strongly, whereas those materials which do not contain the hydroxyl radical do not yield its spectrum in the discharge. Such spectra may, therefore, be used to evaluate the presence or absence of such chemical groups in any given molecule or molecular aggregate, and may be used to quantitatively assay the extent to which such radicals are present.

My invention is not limited to the particular embodiments thereof illustrated and described herein, and I set forth its scope in my following claims:

1. In the analytical treatment of organic compounds and molecular aggregates particularly including high polymers and natural and synthetic macromolecules, the method which comprises dissociating initially non-gaseous specimen material into molecular and polyatomic fragments, introducing such fragments into the positive column of a glow discharge so as to radiate therein, and spectroscopically comparing the radiation with that from another test specimen similarly obtained.

2. That method of analytically treating organic compounds and molecular aggregates particularly including high polymers and natural and synthetic macromolecules which comprises presenting the test specimen in non-gaseous form directly at an electrode in an enclosed highly evacuated space, supplying at the electrode an electrical potential and current adequate to excite and maintain in the space a strong glow discharge, utilizing the glow discharge to break down the test specimen into a dissociation product including polyatomic fragments, and causing the latter to enter the positive column of the discharge in a manner to radiate light for spectroscopic observation.

3. That method of analytically treating organic compounds and molecular aggregates particularly including high polymers and natural and synthetic macromolecules which comprises presenting the test specimen in non-gaseous form directly at an electrode in an enclosed highly evacuated space, supplying at the electrode an electrical potential and current adequate to excite and maintain in the space a strong glow discharge, utilizing the glow discharge to break down the test specimen into a dissociation product including polyatomic fragments, causing the latter to enter the positive column of the discharge in a manner to radiate light, and spectroscopically examining the radiation.

4. That method of analytically treating organic compounds and molecular aggregates particularly including high polymers and natural and synthetic macromolecules which comprises presenting the test specimen in non-gaseous form directly at an electrode in an enclosed highly evacuated space, supplying at the electrode an electrical potential and current adequate to excite and maintain in the space a strong glow discharge, utilizing the glow discharge to break down the test specimen into a dissociation product including polyatomic fragments, causing the latter to enter the positive column of the discharge in a manner to radiate light, and spectroscopically comparing the radiation with that for another specimen similarly obtained.

5. That method of analytically treating organic compounds and molecular aggregates particularly including high polymers and natural and synthetic macromolecules which comprises presenting the test specimen in non-gaseous form directly at an electrode in an enclosed highly evacuated space, supplying at the electrode an electrical potential and current adequate to excite and maintain in the space a strong glow discharge, utilizing the glow discharge to break down the test specimen into a dissociation product including polyatomic fragments, causing the latter to enter the positive column of the discharge in a manner to radiate light, and recording the discharge spectra as a function of time.

6. That method of analytically treating organic compounds and molecular aggregates particularly including high polymers and natural and synthetic macromolecules which comprises presenting the test specimen in non-gaseous form directly at an electrode in an enclosed highly evacuated space, supplying at the electrode an electrical potential and current adequate to excite and maintain in the space a strong glow discharge, utilizing the glow discharge to break down the test specimen into a dissociation product including polyatomic fragments, causing the latter to enter the positive column of the discharge in a manner to radiate light, and making a visible record of changes in the spectra correlated with time.

7. That method of analytically treating organic compounds and molecular aggregates particularly including high polymers and natural and synthetic macromolecules which comprises presenting the test specimen in non-gaseous form directly at an electrode in an enclosed highly evacuated space, supplying at the electrode an electrical potential and current adequate to excite and maintain in the space a strong glow discharge, utilizing the glow discharge to break down the test specimen into a dissociation product including polyatomic fragments, causing the latter to enter the positive column of the discharge in a manner to radiate light, and measuring the influence of the test specimen upon the initiation and maintenance of the discharge and the quality of its radiation with reference to potential variations.

8. That novel method of analytically treating organic compounds and molecular aggregates particularly including high polymers and natural and synthetic macromolecules which comprises presenting the test specimen in non-gaseous form directly at an electrode in a closed chamber evacuated to between about 0.1 and 5. millimeters of mercury, maintaining the chamber pressure substantially within said range, supplying at the electrodes electrical potential over 500 volts and current of at least 0.1 ampere and such as to initiate and maintain an effective glow discharge, employing the glow discharge to dissociate the test specimen into fragments of which some are polyatomic and to introduce the same into and cause them to radiate light in the positive column of the glow discharge, and utilizing the radiation spectra to obtain data as to the composition and history of the test specimen.

9. That novel method of analytically treating organic compounds and molecular aggregates particularly including high polymers and natural and synthetic macromolecules which comprises presenting the test specimen in non-gaseous form directly at an electrode in a closed chamber evacuated to between about 0.1 and 5. millimeters of mercury, maintaining the chamber pressure substantially within said range, supplying at the electrodes electrical potential over 500 volts and current of at least 0.1 ampere and such as to initiate and maintain an effective glow discharge, employing the glow discharge to dissociate the test specimen into fragments of which some are polyatomic and to introduce the same into and cause them to radiate light in the positive column of the glow discharge, and determining the influence of the test specimen upon the initiation and operating characteristics of the glow discharge with respect to electrical potential.

10. That method for determining electrical charge characteristics of test materials which comprises presenting a test specimen at an electrode within a glow discharge tube, initiating and maintaining a glow discharge, causing dissociated polyatomic fragments of the specimen to enter and radiate in the positive column of the glow discharge, and measuring the influence of the specimen upon the initiation and the maintenance of the discharge and upon the quality of its radiation.

DANIEL P. NORMAN.

REFERENCES CITED

The following references are of record in the file of this patent:

UNITED STATES PATENTS

| Number | Name | Date |
|---|---|---|
| 1,829,001 | Geromanos | Oct. 27, 1931 |
| 2,008,066 | Ende | July 16, 1935 |
| 2,251,046 | Gaidies et al. | July 29, 1941 |
| 2,383,600 | Grosdoff | Aug. 28, 1945 |
| 2,393,650 | Metcalf | Jan. 29, 1946 |
| 2,440,267 | Oravetz | Apr. 17, 1948 |

OTHER REFERENCES

Cobine: Text Gaseous Conductors—pages 212–220 and 233–240, 1941. Published by McGraw-Hill Publishing Co.

The Electrochemistry of Gases and Other Dielectrics—by Glockler & Lind, 1939, pages 19 to 27.